Figure 1:
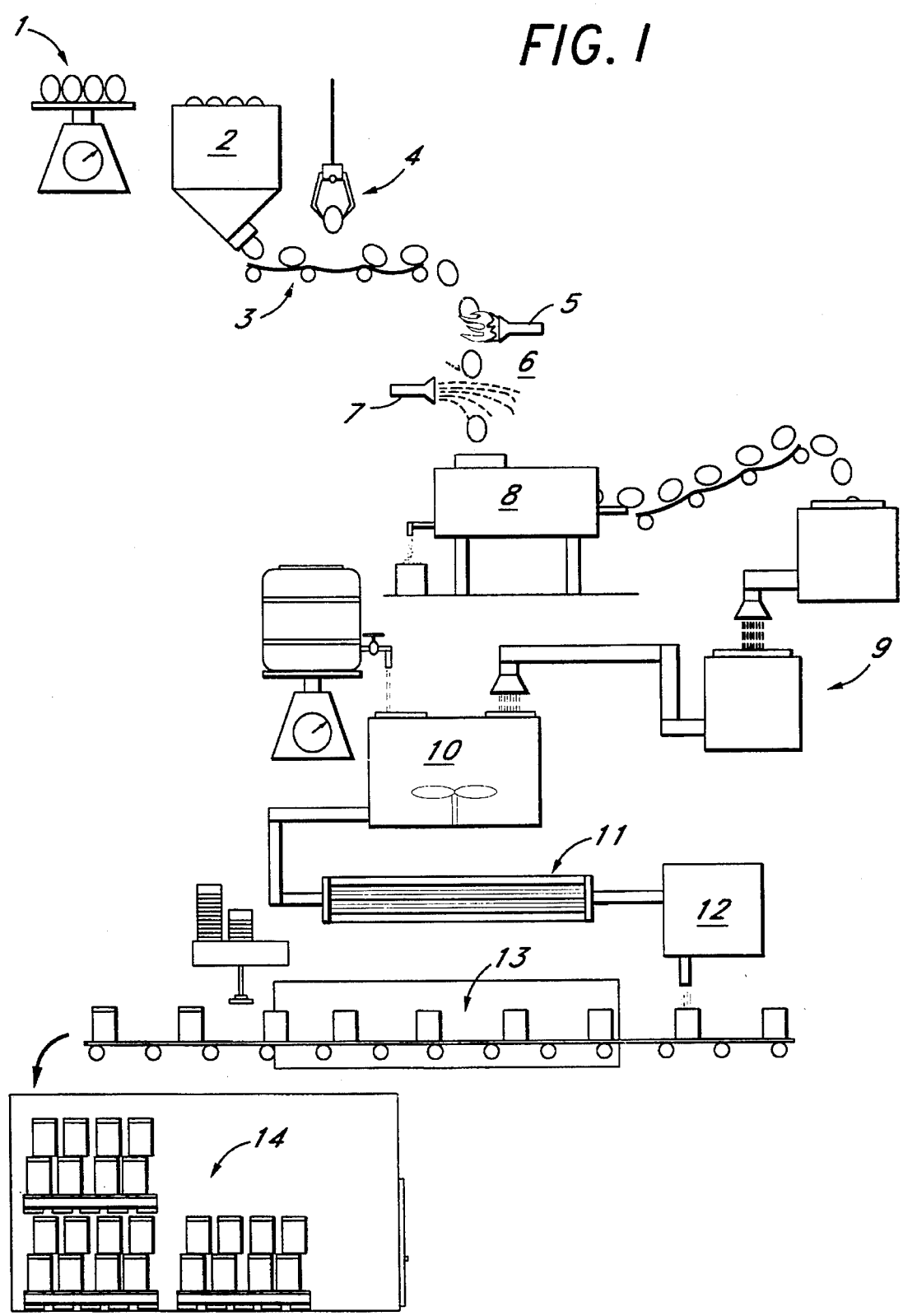

United States Patent

Balasingham et al.

[11] Patent Number: 5,500,241
[45] Date of Patent: Mar. 19, 1996

[54] KIWIFRUIT JUICE PRODUCT

[76] Inventors: Amaranathan Balasingham, 79 Kayes Road, Pukekohe, Auckland; Patrick J. Clement, 1a Irene Avenue, Mount Eden, Auckland, both of New Zealand

[21] Appl. No.: 187,081

[22] Filed: Jan. 26, 1994

Related U.S. Application Data

[63] Continuation of Ser. No. 788,783, Nov. 6, 1991, Pat. No. 5,298,275.

[51] Int. Cl.⁶ .................................................. A23L 2/02
[52] U.S. Cl. ............................................ 426/599; 426/333
[58] Field of Search ..................................... 426/599, 333

[56] References Cited

U.S. PATENT DOCUMENTS

| | | |
|---|---|---|
| 4,477,481 | 10/1984 | Eisenhardt . |
| 4,690,827 | 9/1987 | Kupper . |
| 4,873,112 | 10/1989 | Mitchell . |
| 4,925,686 | 5/1990 | Kastin . |
| 5,000,974 | 3/1991 | Albersmann . |
| 5,053,232 | 10/1991 | Balestrieri . |
| 5,108,774 | 4/1992 | Mills . |
| 5,298,275 | 3/1994 | Balasingham ............... 426/599 |

FOREIGN PATENT DOCUMENTS

| | | |
|---|---|---|
| 0098120 | 1/1984 | European Pat. Off. . |
| 0118034 | 9/1984 | European Pat. Off. . |
| 2616045 | 6/1987 | France . |
| 60-43367 | 3/1985 | Japan . |
| 2-72850 | 3/1990 | Japan . |
| 2-82850 | 3/1990 | Japan . |
| 987945 | 3/1965 | United Kingdom . |

OTHER PUBLICATIONS

Wong 1988 NZ Kiwifruit Feb. issue p. 25.
Lodge, Norman, et al., "A Review of Kiwifruit Processing" *NZ Kiwifruit*, Jul. 1992, pp. 14–15.
Wong, Marie, "Brown is not Beautiful—In a Juice", *NZ Kiwifruit*, Feb. 1988, p. 25.
Struebi, P., "Fruit Juice Processing—and Update on Recent Developmens", pp. 73–76.

*Primary Examiner*—Carolyn Paden
*Attorney, Agent, or Firm*—Knobbe, Martens, Olson & Bear

[57] ABSTRACT

The specification is directed to a novel process for juice and pulp products especially suitable for acidic and difficult fruits whose juices and pulps are susceptible to browning or unpleasant catch flavours. A broad aspect of the invention involves the addition of an acidic sweetening agent whose pH is less than 7 to fruit juice or pulp. Further improvements to the product may be obtained by the chilling of the pulp or juice soon after breaking of the whole fruit occurs as well as by eliminating or preventing broken seed and skin material in the juice/pulp. The addition of pH buffers and/or pH adjusting agents may further improve the product.

13 Claims, 1 Drawing Sheet

KIWIFRUIT JUICE PRODUCT

This application is a continuation of application Ser. No. 07/788,783, filed Nov. 6, 1991, now U.S. Pat. No. 5,298,275.

This invention relates to improvements in juice processing techniques. Primarily directed at the preparation of pulp and juice from fruit, the invention may also be used for other plant matter.

PRIOR ART DISCUSSION

World-wide juice extraction from fruit is on a very large scale. Current annual production of fruit juice concentrate exceeds two million tonnes—comprising 75% orange juice, 23% apple juice and 2% other fruits. Accordingly most research into pulping and juicing techniques has been for improvements in apple and orange based processes. These techniques have then been applied with varying degrees of success to the other 2% of fruit used for juicing. Unfortunately, fruit differ in their composition and these techniques are not always able to produce a palatable product from all types of fruit and/or plant matter.

With apple juice production being representative of processing techniques as a whole, the aim of most research has been to increase the extraction rate i.e. the percentage of concentrate recovered. While ripeness (and sugar level) influence the extraction rate, techniques have been developed to extract up to 95% of the soluble solids of the fruit. To achieve this a high degree of comminution, pulverisation, pressing, heating, chemical and/or enzymatic processing is employed. While a combination of these techniques have been employed successfully with apples and a majority of other fruits, some fruits do not lend themselves to such processes.

One specific example is the kiwifruit (*Actinidia deliciosa*), a commercially successful crop to New Zealand for several decades, and for a lesser period overseas. Widespread popularity of the fruit has prompted considerable research to produce an acceptable fruit juice or pulp. However research has been based on techniques analogous to apple extraction methods employing heat (pasteurisation is still used in many cases to reduce the bacteria count in the product) or excessive comminution. While a juice can be obtained, it is not acceptable at a consumer level. This is due to substantial discolouration and the presence of 'catch', an unpleasant after taste or 'bite' in the mouth after consuming the product.

The presence of chlorophyll and chloroplasts render the flesh of the kiwifruit green. Rapid browning of juices extracted according to normal methods is thought to be due to (60%) oxidative browning of ascorbic acid (vitamin C) and (30%) Maillard reactions between sugars and amino acids. It is neither practical nor desirable to remove these components from a fruit product as has been suggested.

The failure of the prior art in extracting a palatable juice is not considered to be confined solely to the kiwifruit. The absence of many juices in the market is a consequence of a lack of a process providing an acceptable product. The present invention may accordingly find application to the fruit of other species for which conventional techniques are unsuitable.

SUMMARY OF THE INVENTION

It is an object of the present invention to address the foregoing problems or at least to provide the public with a useful choice. Further aspects and advantages of the present invention will become apparent from the ensuing description which is given by way of example only.

According to one aspect of the present invention there is provided a process for the preparation of a fruit product comprising the addition of a sweetening agent with a pH of less than 7 to fruit pulp or juice.

According to another aspect of the present invention there is provided a process for the preparation of a pulp or juice product from fruit comprising the steps of:

removal of skin from the fruit;

soft pulping of the fruit;

addition of sweetening agent;

cooling of the fruit pulp;

According to another aspect of the present invention there is provided a fruit product comprising sweetening agent, and a fruit pulp or juice, the pH of said sweetening agent being less than 7.0 before its inclusion.

According to another aspect of the present invention there is provided a reconstituted product from a fruit product as described above.

The present invention has been developed for members of the genus *Actinidia* and problems encountered with the production of a juice. Fruit products, other than a juice in the narrowest sense of the word, are also addressed by the invention. These fruit generally have a low pH (3.0–3.5), suffer from browning upon exposure of a juice to air and have a chlorophyll content. It is envisaged that while the process of the invention will be amenable to other fruit, the greatest advantage is likely to be realised for fruit suffering problems and characteristics in common with the kiwifruit e.g. a pH of less than 4.5, significant chloroplast levels, or catch (e.g. the fruit of *Monstera deliciosa*). It should not be inferred that benefit from the invention is limited to these types of fruit.

The invention has identified several problem areas, especially for kiwifruit, and addresses their needs. For instance, in a first aspect it is considered that the high temperatures present in most processes instigate and accelerate processes leading to browning and discolouration. The green colour of kiwifruit flesh is attributed to chlorophyll and chloroplasts. These are affected by heat and much of the discolouration resulting from existing processes may arise through heating and consequent denaturing of these components. Various other cell proteins may help buffer these chloroplasts—these protective proteins may be lost through heating, enzymatic and chemical steps and many other steps used in conventional techniques involving breaking or pulverisation of components such as fruit cells, seeds, skin, hair etc. In many cases these components may comprise substances which affect the acceptability of the product. The present invention addresses these problems by processing free of steps in which the fruit pulp is heated. Cooling at particular points in the process can help further reduce undesirable reactions so that an acceptable product may be realised. Rapid cooling also helps avoid cell damage through excessive cell water crystallisation.

In a second aspect it is considered that undesirable effects may be contributed to by excessive processing of the fruit which further damages cell components. This releases further substances into the pulp which are not normally present in the flesh of a natural fruit. For instance it is thought that tannins and oil in the seeds (and to a lesser extent the hair) can react with the highly acidic pulp to give rise to catch. These may all contribute significantly to catch and the invention addresses this by using processing techniques with reduced cell and seed damage. If seeds remain, they are generally in a whole state as they are in the fruit. For appeal, whole seeds may even be introduced into a fruit product.

The third identified factor adverse to an acceptable fruit product involves attention to the pH of incorporated additives. In particular this involves added sweetening agents though other added components may also contribute to the effect. Many fruit are acidic and those with a pH of 6 or less are generally most likely to be affected. Widely used and relatively inexpensive sucrose is alkaline and appears to induce or take part in further undesirable reactions when added to an acidic pulp. The invention addresses the effects of such pH shock by advocating the use of sweetening agents whose OH (preferably pH≦6.5) is closer to that of the fruit. pH buffers and adjusters may also be used to counter pH shock and to maintain a pH giving the best long term storage characteristics for the product, typically a pH close to that of the natural fruit over time.

Each of the above improvements may be used separately to produce an acceptable product for most fruits though best results are obtained through a process incorporating all three aspects. Processes employing aspects 1 and 2, or aspects 1 and 3 can also produce a very acceptable product by reducing the extent of undesirable effects to a normally acceptable degree. The remainder of the specification is directed to processes addressing all three aspects though if desired, the techniques addressing each aspect may be isolated and used singly in a fruit process. Of course different fruit and their inherent problems will dictate which aspects need most to be addressed in preparing an acceptable product.

It is useful to define several terms which shall be used within this specification. These are:

Fruit

In its broadest sense fruit refers to any portion of plant matter from which an edible juice may be extracted. Often the term will describe the fleshy pod containing the seeds of plant, though for simplicity of description shall also be extended to include stalk, bark, leaf and/or any other plant material to which the invention is to be applied to extract a juice or pulp.

Soft-pulping

Relates to a pulping or comminution process which is relatively mild compared to many normal pulping techniques. Soft-pulping is generally characterised by only a minor proportion (generally less than 5–10%) of seeds being fragmented. Further, there is no significant disintegration or lysis of fruit cells or components. Often soft-pulping apparatus employ flexible blades acting on the fruit. Excluded from soft-pulping processes would be chemical and/or enzyme lysis methods, thermal techniques, techniques directed to the breaking down of cells and mechanical techniques which involve excessive pulverisation of fruit material.

Sweetening Agent

This includes a preparation comprising one or more components which are sweet to the human palate. Typically these will comprise various monosaccharides, polysaccharides or other sweetening compounds and agents. This may also include substances such as corn syrup, invert sugars and numerous commonly available food grade sweeteners.

pH Adjusting Agent

This will comprise any compound useful for altering the pH of a mixture or solution by more than 1 pH unit. Suitable agents are of a food grade quality and may comprise a wide variety of acidic, neutral and/or basic compounds.

Juice and Pulp

There are a proliferation of terms describing various consistencies of fruit extracts. The term juice and pulp, unless otherwise indicated shall be used interchangeably and cover all products derived from the comminution or pulverisation of fruit including what are often called nectars, pulps, juices, concentrates and purees. For convenience and to avoid confusion throughout the description of this specification, fruit shall be used to describe plant matter before pulping, 'pulp fraction' will describe the result of the pulping stage and 'product' shall be used after any additional components have been included with the 'pulp'.

DESCRIPTION OF THE INVENTION

The following general description is given by way of example only and with reference to kiwifruit and other members of the *Actinidia* family, including *A. arguta, A. chinensis, A. deliciosa, A. macrosperma, A. polygarna,* and *A. valvata*. As the invention may be used for other fruit, the word 'kiwifruit' may be substituted where appropriate. Comments directed specifically to kiwifruit or other fruit may occasionally be made to instruct the reader how the principles of the invention may best be applied for other fruit. Knowledge commensurate of a worker skilled in the art is assumed.

OPTIONAL PRELIMINARY TREATMENT OF FRUIT

Preliminary steps are optional though if employed generally comprise standard techniques of selection and grading of the fruit, and to remove undesirable matter. Ripe or mature fruit is preferred and for kiwifruit a sugar level of 12°±4° Brix is ideal and indicative of ripeness. Kiwifruit exceeding this Brix level may be acceptable but are likely to be overly mature or fermenting. Kiwifruit with a Brix level below the ideal, should be artificially ripened before use. Time left in storage may be sufficient—kiwifruit picked at 5° Brix rises to 10.5° Brix in 4–6 weeks in cool storage at 0° C. This fruit will ripen to reach 12° C. or higher upon removal from cool storage. Other changes in chemistry also occur as the fruit ripens so that mature fruit within the ideal range often provide a superior tasting product.

The ideal Brix value for different fruit will vary, a general guide being a Brix value signifying good eating of the fruit. It should also be appreciated that selection criteria based on Brix value may not be entirely appropriate for all fruit or where a juice is to be extracted from stalk or leaf matter. It may in some cases be preferable to base selection on product palatability to the consumer or common knowledge in the field.

Cleaning of the fruit is another preferred optional pre-treatment. Brushing of the fruit to remove adhering foreign matter may also be advantageous for haired fruit such as kiwifruit, peaches etc. Conventional washing techniques may be employed. Wash additives aiding cleansing or reducing the bacterial count on the fruit may be employed according to local regulations and requirements.

Many kiwifruit species have a fine hair which is difficult to remove from a juice. While small amounts of hair may not significantly affect product palatability, its removal is generally preferred. Conventional skinning procedures may allow loosened hairs to enter the juice. Hair removal processes, such as thermal or pyrolytic hair removal may be employed. This may be prior to any optional cleaning or grading steps.

For kiwifruit it is desirable to include a step of skin removal before soft-pulping. However, if contamination by hair does not present a problem for the particular fruit the skin may be separated after soft-pulping. Some fruit have skins which can be readily screened out after pulping though also to be considered is the possible introduction of bacteria by non-sterile skins in contact with the pulp. Furthermore, many skins contain substances adversely affecting the taste and qualities of the juice and it may be desirable to remove the skin before any subsequent step in which the substances in the skin could enter the juice or pulp. For kiwifruit, experimental trials have indicated that skin removal is not necessary, though is generally preferred.

A wide variety of skin removal techniques may be employed. These may employ existing techniques for removing skin, cores and/or any other portions of the fruit. These may also include chemical methods of skin removal (e.g. sodium hydroxide bath).

PRODUCING A PULP OR JUICE FRACTION

Subsequent to any of the aforementioned grading and preparation steps, is soft pulping. By this the flesh of the fruit is transformed into a pulp with as little cell disintegration or seed fragmentation as possible. Solid matter may be screened or otherwise removed from the resulting soft-pulp when preparing clarified or reduced solid juices.

Soft-pulping methods are preferred for the invention as it is considered desirable to avoid both excessive cell disintegration and fragmenting components of the fruit such as the seed. Seeds may contain toxic substances (e.g. apricot kernel) or contribute to 'off' or undesirable flavours in a juice. Research leading to the present invention indicates that substances entering a juice from seed fragmentation or excessive cell damage contribute to factors adversely affecting previous attempts at producing successful kiwifruit juice, such as problems of browning and catch factor.

While soft-pulping may comprise a single step of comminution it can also comprise several steps of gentle and successive comminution. A preferred method for fruit sensitive to seed fragmentation or cell disintegration comprises a first step of coarse comminution pre-breaking the fruit into large lumps followed by soft-pulping of the coarse fragments. Skin removal (preferably before finer pulping stages) may be necessary if there has been no pre-skinning step.

The typical output of a coarse comminution step or steps is a semi-liquid pulp with chunks. The typical consistency of the output for kiwifruit is that of a chutney and with an average lump size exceeding 5–10 mm in at least one dimension. Typically the output will readily pass through a screen with 10 mm apertures. The product (other than the seeds) resulting from soft-pulping will typically pass through a screen whose apertures are less than 1 mm in diameter. For firm or relatively dry fruit (for instance the apple), it may be desirable to include liquid to aid the soft-pulping process. This may be achieved by adding fluid or other types of fruit.

One possible multi-stage soft-pulping technique initially bursts fruit by passing it through spaced rollers biased towards each other. This squashes the fruit so the skin (if present) is split, the burst fruit is substantially intact but readily separable into large fragments depending on the consistency of the fruit. Other bursting methods may be employed.

Another technique uses cutting or chopping methods to fragment the fruit. While this may use any device incorporating blades or cutting edges for the breaking fruit, seed and cell destruction require consideration. Parameters such as the speed of the blade, cutting duration and cutting edge shape should be varied to minimise this type of damage. For problem fruit it may be desirable to use choppers with blunt blades which divide rather than cut the fruit. A blade which is substantially tear-shaped in cross-section, the leading edge being the pointed end of the tear, has been used with success with kiwifruit. The leading apex is not exceptionally sharp though will readily penetrate and fragment the flesh of the kiwifruit.

The product of bursting and breaking methods (which may be used in conjunction) generally require further pulping to a more uniform consistency and particle size. This may be any process producing a finer particle size than the coarse comminution methods though possible cell and seed damage still need attention. A plurality of finer comminution steps may be employed to progressively pulp the fruit fraction and each step need not be the same as any other. The choice of soft-pulping methods will generally be a compromise between process costs and the maximum sustainable seed and cell damage for a palatable end product. Soft-pulping apparatus employing flexible blades pressing fruit and pulp against a screen have been found to be especially suitable with acceptably low rates of cell and seed damage.

After soft-pulping and depending on the particular fruit, a flowable pulp of substantially uniform texture and fine particle size results. This may be made the basis of a juice product or the percentage solid content altered (e.g. reduced or concentrated) according to the desired product. Solid content may be altered during soft-pulping (e.g. screening or filtering methods) or as a subsequent step. As it is desirable to cool the pulp fraction as soon as possible after pulping, it is preferable for any subsequent steps altering solid content to occur when the pulp is at a reduced temperature (see comments on cooling below).

THE COOLING OF FRUIT, PULP AND PRODUCT

It is considered that rapid cooling of the soft-pulped fraction is desirable for an acceptable product. Though the detailed mechanisms of the invention are not fully understood, it is believed that rapid cooling slows the rate of any browning reactions as well as lessening any pH shock or unwanted side-reactions when other components of a fruit product are added to a pulp fraction.

It has also been noted that in the process thus far, browning of the pulp fraction proceeds at a fairly slow rate compared to kiwifruit processed by conventional methods. These are considered due to the absence of any steps heating the fruit or pulp fraction and that, in practice, washing and pulping generally occurs at less than 30° C. This eliminates some unwanted denaturing and other reactions which only occur at the elevated temperatures of traditional processes. Bacterial spoilage also appears to be reduced significantly.

Cooling of the pulp fraction to 10° C. or less should occur within 90 minutes of pulping. A temperature of 5° C. or less is more desirable though a temperature of approximately 0°±2° C. is most preferable. Lower temperatures may make incorporation of other components difficult but down to −10° C. can sometimes be tolerated. These temperatures are suitable for kiwifruit and significantly stabilise the pulp fraction with respect to most undesirable reactions. These temperatures are considered suitable for other fruit though for fruit less susceptible than kiwifruit to browning or catch increasing reactions, the cooling time may be extended. Similarly, the chill temperature may be raised to decrease refrigeration costs for the process. Conversely, fruit particularly sensitive to browning or catch inducing reactions may require more rapid cooling, lower temperatures or cooling soon after skin rupture/removal. Some experimentation may be required to find the optimum conditions for each type of fruit. Quality control checks may also suggest further refinements to the cooling parameters.

Cooling fruit prior to and/or during soft-pulping can aid the rapid cooling of the pulp fraction. Performing any washing step and soft-pulping at a temperature of 10°–15° C. was found to be feasible on a production scale though may not always be economical depending on ambient conditions. Cooling the fruit to 0°–5° C. during soft-pulping processes would undoubtedly yield an improved product as cool processing, in addition to increasing the rapidity by which a pulp may be chilled, also retards browning reactions which may occur once a fruit's skin has been removed or ruptured. However cool processing may not always be practical on a large scale. In a tropical environment housing the plant in a cool store may be advantageous, especially if adjacent to any cold-storage facilities for the fruit. Cold-water washing steps may be used to pre-cool fruit.

It may be appreciated that unless soft-pulping processes are performed at reduced temperatures, the time spent by fruit passing through the pulping steps should not be excessive. As a general guide, where the average pulp temperature is in excess of 25° C. pulping will ideally be within a time frame of 15 minutes before cooling though the temperature should not exceed 40° C., and preferably not exceed 30° C. (higher temperatures may be acceptable for other fruit) for any extended period (i.e. more than 90 seconds). For a temperature range of 18°–25° C. this may be extended to 30 minutes, 10°–15° C. to 45 minutes, less than 10° C. to 2 hours and for less than 5° C. up to a day or more. Working within these time frames will generally yield an acceptable product though processing should be as rapid as possible. Longer periods may be employed though with possible deterioration of the final product. Other fruit may tolerate lesser or longer periods and preliminary trials are recommended whenever implementing a full scale process.

When cooling to freezing or near freezing temperatures (generally less than 0° C.) ice crystal formation may result in damage to fruit cells. This in turn may be responsible for the introduction of flavour (especially catch) and chemistry changes upon thawing. Freezing techniques widely used within the food industry may be drawn upon to reduce crystal formation. Typically these rely on rapid freezing techniques or additives, often to reduce crystal size. In some embodiments sweetening agents may be added prior to, or during cooling to aid their addition and/or to reduce adverse crystallisation effects.

In a preferred embodiment, a heat exchanger is used to rapidly cool the pulp fraction to the desired temperature. Additives which reduce the adverse effects of crystal formation, such as some sweetening agents, glycerol etc. may also be incorporated into the pulp fraction prior to, or during, cooling.

Normally the addition of sweetening agents and additives is generally performed at around 0° C. as blending components is easier if the water content in the pulp has not yet begun to freeze and so their effect on ice crystal inhibition may be realised. A multiple stage cooling procedure may be advantageous if the other components are not blended during cooling.

In most embodiments cooling of the product may occur to a temperature suitable for storage. Many commercial refrigeration units operate in the vicinity of −10° C. to −18° C. and this has been found ideal for long term storage of the product. Samples have been stored for over 9 months at this temperature with no discernible deterioration of the product. If such long term storage is not required, a product may be refrigerated near −10° C. to 0° C. until required for use. Freezing and solidification of the pulp fraction is typically around −4° C. Storage below freezing typically increases storage times significantly.

It can be appreciated that when cooling results in a frozen product, the temperature transition near the freezing point should desirably proceed as rapidly as possible. A preferred embodiment to be described later utilises a stream of nitrogen gas to rapidly cool the product. Near cryogenic temperatures for the gas stream can be obtained by the draw-off of nitrogen gas from liquid nitrogen, which if managed properly can result in very rapid cooling. Other known methods can also be used.

As a product may become solidified after cooling, it is preferable to package the product while it is still flowable. Alternatively, the product may be frozen into large blocks which can be divided for subsequent packaging.

THE ADDITION OF SWEETENING AND OTHER AGENTS

An important step of the invention is the inclusion of a sweetening agent (which may comprise one or more substances). There are several criteria which should be observed for producing an acceptable fruit product substantially free of catch. One of these relates to the relative pH of the juice extract and the sweetening agent. Many fruits, pulps, and juice extracts are highly acidic in nature. The kiwifruit is more acidic than most and has a pH of approximately 3. In comparison, many saccharides range from being mildly acidic through to alkaline. For example, sucrose (common table sugar) has a pH of approximately 8, whereas invert sugar, a syrup comprising the monosaccharides fructose and glucose is mildly acidic with a pH of 6–6.5. From the process by which invert sugar is normally made, lower pH's are obtainable though with possible contamination by mineral acids. If this is acceptable to local food regulations an invert sugar with a lower pH could be used. Substitution of the mineral acids used for sucrose hydrolysis may circumvent some food regulations—e.g. some phosphoric acids are acceptable food additives. The pH of other saccharides are documented in reference literature.

A factor in determining the suitability of a sweetening agent is the relative difference in the pH of the two. Some prior art experiments have attempted to use sucrose as a sweetening agent for kiwifruit. However, these trials have not been successful in eliminating the unpleasant catch factor which in some cases has even been enhanced.

The present invention has centred on trials using a glucose/fructose mixture with a pH of 6–6.5. In these experiments, the catch factor of the juice product was minimal or undetectable. On this basis, failure of sucrose to eliminate (or perhaps to even encourage) the catch factor has been attributed to unwanted acid/base side reactions. While the pH difference between the acidic kiwifruit pulp (pH 3) and the glucose/fructose additive (pH 6–6.5) may still be sufficient for undesirable side reactions to occur, the lower pH differential either retards or eliminates these reactions.

It is noted that while the reasons for the differences observed between the alkaline sucrose and acidic glucose/fructose are not conclusively understood, the proposed theory is supported by observations to date and by the success of the present invention. It is also noted that it is considered that the catch factor is a result of the accumulation of a number of factors rather than being as a result of any one reaction or happening. Consequently a preferred embodiment of a process according to the invention is directed towards reducing any circumstances which will contribute thereto.

On the basis of the above, it is therefore desirable that a sweetening agent is chosen whose pH matches as closely as possible to that of the natural pulp of the fruit or of the juice extract. The difference between what is acceptable and what is not will vary according to the degree of acidity of the fruit and the pH differential to the sweetening agent as well as the nature of the fruit and the components therein (and the nature of the sweetening agent). In the case of kiwifruit, the pH difference between juice and sweetener of 3–3.5 pH units (approximately) was found to be acceptable. It is envisaged that this range may also be applied to most other fruits though the smaller the pH differential then the more preferred the combination. As most fruit have a pH of less than 6, it is desirable to use sweeteners which are acidic (i.e. pH<7), preferably pH 6.5 or less and ideally a pH less than 5.5.

Other factors also have to be considered in the selection of a sweetening agent. One is the solubility of the agent in the juice extract. This is more important if the juice has already been cooled. Sucrose, which is normally provided in a crystalline form, dissolves only slowly in the juice extract. While the sucrose (or any other sweetening agent) may be pre-dissolved in a suitable solvent such as water or water/alcohol, care has to be taken that upon addition of the resulting solution to the cooled pulp, the sweetening agent does not crystalise or precipitate from the solution before even mixing can occur. Crystallisation of sucrose in the frozen product is also a problem and moderate to high levels of sucrose do not readily re-enter solution when the product is thawed at refrigerated temperatures. An excess of added fluids may also alter the consistency of the product to an unacceptable degree.

Due to the inherent problems of sucrose, it is best avoided in most embodiments of the present invention and especially for embodiments incorporating fruit with catch problems or where long term freezing of a product is required. Fructose/glucose mixtures are readily available as a syrup and it has been found that this syrup will readily combine with a juice extract which has been chilled to approximately minus 4° C. Preferably though, the juice extract will be in the range of 10° C. to minus 5° C. when adding a glucose/fructose syrup. Ambient temperatures may be used though there is a compromise between the easier blending of additives at warmer temperatures and maintaining the product at preferred lowered temperatures. Provided the pulp is not maintained for prolonged periods at warmer temperatures, addition of sweetening agent before cooling may sometimes be advantageous. Care has also to be taken that upon standing or storage, the sweetening agent does not settle out. Here again, a glucose/fructose mixture has proven to be superior to sucrose.

As a further consideration, it may be desirable to rely on sugars occurring naturally in the fruit so as not to alter or detract froth the taste. This may also avoid any possible side reactions contributing to catch, discolouration etc. Glucose and fructose are commonly found in many fruits.

A final consideration is that of cost. While many other saccharides may be used, including lactose, galactose, sorbitol etc, the high cost of these sugars generally precludes their use. Alternatively, some other sugars may not conform to other criteria listed above. Artificial sweeteners such as saccharin or NutraSweet® may also be used though preferably in conjunction with another substance such as glucose, fructose etc.

The quantity of sugar or sweetening agent added will vary according to the type of fruit and requirements. Typically, for a fruit product, a Brix value of 35°±10° is desired. However, the actual level need not be in this range and consumer requirements will generally dictate this level. By way of example, a kiwifruit juice concentrate prepared according to the invention described herein, will have a Brix of approximately 30°–35°. This may be diluted to form a reconstituted fruit juice of typically 12°±4° Brix but may vary according to user preference.

While the addition of a sweetening agent could conceivably be omitted from the process, there are product advantages associated with its inclusion. Many fruits are afflicted by catch and the addition of a sweetening agent can help mask this problem. The correct selection of a sweetening agent can avoid enhancing catch and can ameliorate the catch flavour. The correct choice of sweetener can also enhance the flavour of the fruit without the need for added aroma essences or enhances. Typically this is by masking some of the undesirable properties of fruit such as bitterness or excess acidity and is due partly to the average human's affinity for sweetness. Trials with a kiwifruit juice product according to the present invention indicated a liking for the product even by participants who do not normally like kiwifruit.

It is suspected that some buffering of fruit and juice components, reducing the formation of catch or discolouration attributes, may occur at high Brix values. This is supported by the observed long term stability of the frozen product. The use of sweetening agents such as invert sugar is also considered to infer some antioxidant properties to the product helping to retard some undesirable reactions in the product. The higher the proportion of such added sweetening agent, the more pronounced the effect. However, products having Brix levels of 30°–35° show some resistance to discolouration. Reconstituted fruit juices with a Brix of 12° and chilled to around 0° C. exhibit a greater resistance to discolouration than a juice of a similar consistency from pure kiwifruit pulp. Product enhancements through the use of a suitable sweetening agent would appear to be indicated.

Further, the natural preservative effects of systems having a high Brix value is suspected. It is noted that a juice product according to the present invention has not been pasteurised as characteristic of most other juices and processes. Hence any preservative effects which are contributed by the sweetening agent will help prolong the shelf life of the product. Honey, which is known for its preservative effects, may be used as either the sole sweetening agent or in conjunction with another agent. It is unknown whether the preservative effects of honey are due to its high sugar content or high osmolarity or both. The different compositions and nature of honeys requires that consideration be given to the choice and selection. Not only must solubility and pH be considered, many honeys have a distinctive flavour which may enhance or detract from the fruit product. It is conceivable that some honeys may contain components that enhance catch or have unwanted side reactions with components of the fruit. As a precaution, preliminary trials are advisable to take into account the variations in local honeys. Consequently in many cases a sweetening agent may be chosen which also exhibits at least one of antioxidant, antibacterial and preservative properties in respect of the product.

Further, regarding the pH the various sugars and saccharides, it may be possible to alter the pH of a sweetening preparation by the addition of the pH adjusters. Thus for example, sucrose could conceivably be employed if an additive which reduced the pH to approximately 6 or less were added before the preparation was combined with the juice extract. However, it is possible that a reaction between sucrose and the pH adjusting additive may occur forming unpleasant tasting compounds if the pH differential was too great. If such a modification were employed, then it could conceivably be combined with a step to alter the pH of the pulp or product.

Substances for adjusting pH may also be used to enhance the flavour of the fruit product or to appease consumer tastes. Alternatively or additionally it may be to counteract any possible pH shock effects resulting from the addition of an alkaline or mildly acidic sweetening agent to an acidic pulp, or where there is a difference in the pH between the juice extract and the added sweetening agent. It is possible that the alteration in pH resulting from the combination may cause unwanted side reactions, including the possible denaturation of proteins or enzymes in the fruit. It is therefore, desirable in some embodiments to adjust the pH through the addition of a suitable agent, as soon as possible (in most cases less than 90 minutes is acceptable though this may vary) after the addition of a sweetening agent, if not beforehand.

Restoring the pH of the juice extract to close of that of the natural pulp (preferably within 1–2 pH units of same) may also help reduce the likelihood of any undesirable pH induced long term reactions which may contribute to spoilage of the product.

pH adjusting agents may also be chosen to act as a pH buffer for the juice extract. Typically this will be through the creation of a conjugate acid/base pair. It may be desirable to chose a pH adjusting agent which occurs naturally in the fruit e.g. citric acid to create a citric acid/citrate buffer. The use of agents which occur naturally will also reduce the possibility of the pH adjusting agent detracting from the taste of the product and include a wide range of acids including, for example, malic acid, ascorbic acid etc.

There may be advantages to adding buffering agents prior to the addition of a sweetening agent. This may help further reduce the possibility and effects of pH shock. Experiments for a kiwifruit product have indicated that the addition of citric acid as a pH adjuster/buffer is not normally necessary though its addition has been retained as it was considered that the resulting product was slightly superior. For other embodiments of the process within the scope of the invention, but not falling exactly within the conditions of the preferred embodiment, the use of pH adjusting agents and/or buffers may be more important for obtaining a superior product.

Furthermore, it is noted that under storage, the chemistry of most juices will vary. For kiwifruit, the acid content of the juice will drop. The addition of a suitable buffering or pH adjusting agent, will help preserve the pH of the product over a longer period. This will also defer any undesirable long term reactions resulting in browning or discolouration of the juice.

The foregoing methods and processes, which have been described in a general manner by way of example only, produce a fruit product which typically has a longer storage period than a straight pulp or juice. In most cases, a product which is superior in taste and appearance is obtained. This is the case with kiwifruit, towards which most of the examples have been directed though once again it is emphasised that virtually any fruit may be employed and take advantage of the present process. Some adaptation of the general methods described herein may be required to adapt the process to a specific type of fruit or fruit mixture. These modifications will become more readily apparent from the description to follow.

For instance there may be incorporated into the product other additives such as preservatives, colouring agents, essential oils, flavour enhancers etc. Commonly used food additives may be incorporated.

As a further modification to the process, a juice or pulp fraction may be filtered or treated to remove haze. This may comprise a known method though criteria governing steps and methods described herein should also be considered. Adding other juices to kiwifruit juice often causes hazing, often necessitating clarification or some treatment.

Greater control or monitoring of each step may also be required for other fruit. Some fruit may be less or more sensitive to the pH of any additives. There may be known or extensive side reactions with certain additives and thus further selection criteria for added components. While essential oils may be added, as in many other fruit juice processing techniques, it is not generally necessary to do so for the present invention.

EXAMPLE 1 OF A PREFERRED EMBODIMENT OF A PROCESS

Kiwifruit which had been harvested between mid April and mid June in New Zealand climatic conditions and which had been cool stored (subsequent to normal grading and packing, at a temperature of 0°±0.5° C. for a period of 4–6 months) was ripened to a Brix level of between 12–16.

A batch of 300 kg of kiwifruit was selected and transferred to the processing facility within one hour. The fruit was washed in cold water (approximately 10° C.) to remove dust, loose hair and any fungal spores. The fruit was then graded by hand to remove any fruit obviously soft or badly stained before being placed into self-draining plastic crates and left for 15–20 minutes to partially dry.

The fruit was then fed manually into a modified hammer mill having tapered blades of substantially tear-shaped cross-section i.e. a tapered leading edge and a spherical trailing edge. The machine was a modified 'Model D comminuting machine manufactured by 'Manesty Machines Limited' of Liverpool, United Kingdom. Fruit was fed through the mill at a rate of approximately 15 kg/minute. A 12.5 mm sieve plate was used to restrict particle size of the output. The resulting output was a semi-liquid and chunky mash which was collected.

The mash was transferred to a pulper—finisher ( SNB280 Model 57H—by LANGSENKAMP of Indianapolis USA). The pulper—finisher was set up with a 0.8 mm screen after early attempts using larger screen diameters allowed seeds to pass therethrough. The pulper—finisher was fed the mash at a rate of approximately 3–4 liters per minute.

The output using the 0.8 mm screen contained some hair and seed. A smaller screen would reduce this though 0.8 mm represented a reasonable compromise between processing time and quality. It is also possible that several screening processes may be used to improve the quality of the product.

The reject portion of the fruit, i.e. the pomace, was ejected into a separate container and discarded. A total of approximately 230 liters of pulp fraction was produced and transferred into clean 10 liter plastic containers having sealable lids and placed into frozen storage at minus 18° C. To each 10 kg lot of cooled fruit pulp was added 7.0 kg invert sugar (a clear liquid of 72° Brix), and 0.2 kg of citric acid. These were thoroughly mixed at ambient temperature and resulted in production of a juice concentrate. To reconstitute into a juice, 2 pans of water are added to 1 part of the product. The preferred sugar levels are 35°±10° Brix for the product and 12°±4° Brix for the reconstituted drink. In quantities the following range may be adopted:

| Kiwifruit or other fruit pulp | 10–15 kg |
| Sweetening agent e.g. Invert sugar | 0.1–15 kg |
| Citric acid | 0–0.6 kg |

Higher ratios of sweetening agent can be used though typically problems of dissolution (with solid additives) or excess product dilution (and thin consistency) may be a problem. If additional sweetening is required, it may be advantageous to make use of sweeter substances, including artificial sweeteners.

For kiwifruit a preferred composition comprises:

| Kiwifruit pulp | 12.5 kg |
| Invert sugar | 7.0 kg |
| Citric acid | 0.2 kg |

Of course this is highly subjective and various other combinations may be employed to appease palates of different nations or sectors of the community as well as for other fruit.

EXAMPLE 2 OF A PREFERRED EMBODIMENT OF A PROCESS

An example of a larger scale process is given with reference to the schematic process sequence of FIG. 1.

Incoming fruit are weighed (1) before being transferred to a hopper (2). Ideally fruit have been stored in cool storage to reduce their temperature. Fruit chilled to less than 10° C. are preferable. Fruit are regulated at a controlled rate by the size of the hopper opening onto a conveyor (3) where the fruit are subsequently graded (4) to remove rejects. This may be performed by hand or make use of available automated grading equipment.

The fruit is then preconditioned (5) to either remove hair (a pyrolytic flaming step to singe off hair is preferred) or to soften the skin (for instance a lye bath though this method is not generally preferred). For flaming processes which burn the hair, the temperature of the fruit should not become elevated. Short burn times and pre-cooling of fruit can mean that the flesh of the fruit other than that immediately adjacent the skin, may not rise above 30°–40° C. Rapid cooling by a subsequent washing step may be used to advantage, especially if in chilled water (preferably 10° C. or less). Alternatively preconditioning may comprise only a washing step, preferably in chilled water to cool or keep cool the fruit, prior to skin removal (8).

An inspection conveyor (7) leads from preconditioning (8) to skin-removal which is performed by a Model 335005-3 HC Peeler by FILPER MAGNUSON of Nevada USA. This machine makes use of arrays of rotating soft flexible discs defining and counter-rotating about a central chamber for the fruit. The process is accompanied by washing and the apparatus represents a gentle means by which the skin of many fruit may be removed. Minimal fruit or cell damage appears to result from this apparatus.

The peeled fruit are led to two consecutive soft-pulping devices (9). The first is a COMOMIL 196-5-0078 by QUADRO ENGINEERING INC. of St Jacobs, Ontario, Canada. The second is a SNB280 Model 57H pulper-finisher by LANGSENKAMP of Indianapolis, USA. The first has an output screen with apertures of approximately 20–30 min. The output is fed into the second device whose output screen has apertures of approximately 0.5–1.0 mm. The output is a relatively fine, flowable pulp fraction. A substantial proportion of seed and remaining hair is also absent. If these represent a problem then finer screen sizes may be employed or additional screening steps included.

The output is fed to vats (10) which may be refrigerated. Here invert sugar is added and blended into the pulp fraction within the vats. Citric acid and any other desired components are also included at this stage.

After blending the vat contents are pumped through a Stainless Steel heat exchanger unit (11) using a glycol coolant to rapidly cool the product to 0° C. to −10° C.

The cooled product is fed to apparatus (12) packaging the product into containers. In the described process small containers are preferred as allowing more rapid cooling of the product. The lids are not applied until after freezing of the product. Undoubtedly many other techniques could be substituted.

The unlidded containers travel through a freezer tunnel (13) where nitrogen boiled from liquid nitrogen (−196° C.) circulates about the containers to rapidly chill the contents. While this is expensive and may require liquid nitrogen producing plant, the rapid freezing helps minimise ice crystal formation. As aforementioned, it is acceptable to use other, and perhaps less rapid, freezing technology though there may be some loss in product quality. At this stage the containers may be sealed and stored at preferably less than −10° C. until needed.

The entire process proceeds fairly rapidly and in a typical application less than 90 minutes elapses between feeding of fruit to the peeler (8) and freezing (13). The fruit and pulp fraction is ideally maintained at 10° C. or less during this period.

The aforementioned processes have been described for kiwifruit and represent the best methods of effecting the invention currently known to the applicants. Undoubtedly further improvements and refinements will be made within the scope of the invention described herein. Trials indicate that little or no modification of these procedures will be required for fruit such as: members of the peach and apricot families, tamarillos, persimmons, plums and certain melons such as the prince, rock and musk melons. Alteration of the amount of added sweetener will be required to compensate for different sugar levels in the fruit. A product level of 35°±10° Brix may be relied upon though can be altered to consumer taste preferences or for stronger concentrates. Peeling procedures for fruit such as the melons may need to be altered and pre-bursting may be desirable.

EXAMPLE 3 OF A PREFERRED EMBODIMENT OF A PROCESS

Essentially the same as example 2, this method makes use of pre-frozen fruit. Ripened kiwifruit which have been frozen (typically<−5° C. and preferably<−10° C.) are rapidly heated for a short period to loosen their skin with minimal thawing of the flesh. A hot water bath or a pyrolytic dehairing method are two techniques which may be used. The still frozen fruit are fed to the Model 335005-3 HC Peeler by FILPER MAGNUSON fitted with abrasive rollers.

The peeled fruit are thawed to 0°±4° C. before proceeding to soft-pulping. This may be economically accomplished by allowing the whole fruit to stand for a period of time (perhaps overnight). If the process can be accelerated without localised heating of the fruit then some advantage in product quality may be realised. Incorporation of the sweetening and other agents at this point is possible, the temperature of the added components helping thaw the fruit articles.

The remainder of the process is substantially as described for example 2.

The kiwifruit product of these processes generally retains flexibility and can be scooped in a manner similar to ice cream. It is typically a light green frozen product with a fine crystal texture. At minus 5° C. the product will flow and can be pumped. At minus 18° C. the projected life of the kiwifruit product is in excess of 12 months. Once converted into a drink or other forms, shelf life will decrease.

A scooped concentrate at minus 18° C. recombines with water to form a cold drink in approximately 3 to 5 minutes with no heating. Other liquids (including alcoholic spirits) could also be used for reconstitution or the product made the basis of a liqueur. While a concentrate may be reconstituted into a juice or drink, it can also be employed, for example:

as an ice lolly as a flavour enhancer or concentrate as an ice cream/yoghurt/frozen desert additive or flavour.

It should be appreciated that aspects and advantages of the present invention have been described by way of example only it should be appreciated that modifications and additions may be made thereto without departing from the scope of the invention as defined in the appended claims.

We claim:

1. A fruit product substantially free of discernible catch which is derived from a fruit of the genus *Actinidia*, comprising a soft-pulped fruit pulp or juice and a sweetening agent, wherein a minor proportion of the seeds present in said product are fragmented, said product having the green color of kiwifruit flesh in the absence of any added coloring agent.

2. The fruit product of claim 1, wherein said green color is substantially the same as the color of the fruit from which said product is derived, said fruit being ripe and having a sugar level in the range of about 12°±4° Brix.

3. The fruit product of claim 1, additionally comprising a coloring agent.

4. The fruit product of claim 1, wherein the level of catch of said fruit product does not substantially exceed the level of catch of the fruit from which said product is derived, said fruit being ripe and having a sugar level in the range of about 12°±4° Brix.

5. The fruit product of claim 1, wherein said fruit product is derived from the fruit of the species *Actinidia chinensis*.

6. The fruit product of claim 1, wherein said fruit product has a sugar level in the range of about 35°±10° Brix.

7. The fruit product of claim 1, wherein less than about 5% of the seeds present in said product are fragmented.

8. The fruit product of claim 1, where said sweetening agent is acidic.

9. The fruit product of claim 1, wherein said fruit pulp or juice is produced by a method which excludes chemical or enzyme lysis methods, thermal techniques, techniques directed to the breaking down of cells, or mechanical techniques which involve excessive pulverization of fruit material.

10. The fruit product of claim 1, wherein said sweetening agent is selected from the group consisting of invert sugar, glucose, fructose, and honey.

11. The fruit product of claim 1, wherein said product is a juice.

12. The fruit product of claim 11, wherein said juice has a sugar level in the range of about 12°±4° Brix.

13. The fruit product of claim 1, wherein less than about 10% of the seeds present in said product are fragmented.

* * * * *

UNITED STATES PATENT AND TRADEMARK OFFICE
CERTIFICATE OF CORRECTION

PATENT NO.  : 5,500,241
DATED       : March 19, 1996
INVENTOR(S) : Amaranathan Balasingham, Patrick J. Clement, Bruce W. Donaldson It is certified that error appears in the above-indentified patent and that said Letters Patent is hereby corrected as shown below:

```
     On the cover page, please        section [76] Inventors to read as
follows:
    "Amaranathan Balasingham, 79 Kayes Road, Pukekohe, Auckland; Patrick
J. Clement, 1a Irene Avenue, Mount Eden, Auckland; Bruce W. Donaldson,
Applefarm, Sutton Road, RD 4, Papakura, Auckland, all of New Zealand."
Column 16,
In Claims 2, 4 and 12, please change "12°±4° Brix" to read "12±4°
Brix".
Column 16, line 18,
In Claim 6, please change "35°±10° Brix" to read "35±10° Brix".
```

Signed and Sealed this

Twenty-third Day of July, 1996

Attest:

BRUCE LEHMAN

*Attesting Officer*          *Commissioner of Patents and Trademarks*